US012717374B2

(12) United States Patent
Li et al.

(10) Patent No.: US 12,717,374 B2
(45) Date of Patent: Aug. 25, 2026

(54) MODULARIZED CLOCK CONDITIONING

(71) Applicant: QUALCOMM Incorporated, San Diego, CA (US)

(72) Inventors: Wei Li, Cupertino, CA (US); Lalitkumar Nathawad, Pleasanton, CA (US)

(73) Assignee: Qualcomm Incorporated, San Diego, CA (US)

( * ) Notice: Subject to any disclaimer, the term of this patent is extended or adjusted under 35 U.S.C. 154(b) by 104 days.

(21) Appl. No.: 18/759,457

(22) Filed: Jun. 28, 2024

(65) Prior Publication Data

US 2026/0003389 A1 Jan. 1, 2026

(51) Int. Cl.
*G06F 1/08* (2006.01)

(52) U.S. Cl.
CPC .................................... *G06F 1/08* (2013.01)

(58) Field of Classification Search
CPC ........................................................ G06F 1/08
See application file for complete search history.

(56) References Cited

U.S. PATENT DOCUMENTS

| | | | | |
|---|---|---|---|---|
| 8,354,869 | B1 * | 1/2013 | Sheng | G06F 1/08 327/398 |
| 11,579,649 | B1 * | 2/2023 | Chen | G06F 1/08 |
| 2004/0158761 | A1 * | 8/2004 | Matsuoka | G06F 1/08 713/600 |
| 2008/0191678 | A1 * | 8/2008 | Feldtkeller | H02M 3/157 323/282 |
| 2009/0019303 | A1 * | 1/2009 | Rowland | G06F 1/3237 713/600 |
| 2018/0090186 | A1 * | 3/2018 | Kang | H03L 7/091 |
| 2019/0097637 | A1 * | 3/2019 | Hutton | H03L 7/08 |
| 2024/0088907 | A1 * | 3/2024 | Fujibayashi | H03L 7/0995 |
| 2024/0103077 | A1 * | 3/2024 | Kandula | G01R 31/31907 |
| 2025/0211351 | A1 * | 6/2025 | Singhal | H04J 3/0697 |

* cited by examiner

*Primary Examiner* — Zahid Choudhury
(74) *Attorney, Agent, or Firm* — Gerald P. Joyce, III

(57) ABSTRACT

Certain aspects of the present disclosure provide a clock conditioning circuit configurable with multiple operating modes to generate customized clock signals for a plurality of processing nodes. The clock conditioning circuit may include one or more first circuits, each configurable to monitor one or more parameters indicative of a condition of a first clock signal and to generate one or more control signals based on the monitoring and one or more second circuits, each configurable to generate a second clock signal by conditioning the first clock signal based on at least one of the one or more control signals generated by at least one of the one or more first circuits.

20 Claims, 8 Drawing Sheets

MODULARIZED CLOCK CONDITIONING

TECHNICAL FIELD

Certain aspects of the present disclosure generally relate to electronic devices and, more particularly, to techniques and apparatus for clock signal conditioning.

BACKGROUND

Electronic devices use clock signals for various purposes. For example, communication devices often use clock signals to control various types of circuits. The clock signals may be distributed throughout the communication device through dividers, buffers, repeaters, and/or other suitable circuits. For example, a communication device may include a clock synthesizer to generate a root clock signal. The root clock signal may be processed by a frequency divider designed to divide a frequency of the root clock signal by two and create a clock signal with a 50% duty cycle. The clock signal may then be distributed through clock buffers and/or clock repeaters to circuits within the communication device.

Some communication devices may include multiple wireless transmitters to transmit multiple data streams, and may include multiple wireless receivers to receive multiple data streams, for example, to increase communication bandwidth. These communication devices, which may operate in multiple-input multiple-output (MIMO) systems, typically offer increased peak data rates, increased spectral efficiency, and increased quality of service by communicating with each other using a plurality of parallel data streams (e.g., as compared with communication devices that transmit a single data stream).

Communication devices operating in MIMO systems may include a plurality of radio frequency (RF) transmit chains, each of which may transmit a corresponding one of a plurality of data streams. For multiple transmit chains to transmit multiple data streams at the same time, it is important that the clock signals provided to the multiple transmit chains are (and remain) synchronized with each other. Thus, there is a need to improve timing synchronization between clock signals provided to multiple transmit chains of a communication device that operates in a MIMO system.

SUMMARY

The systems, apparatus, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

One aspect provides apparatus an apparatus that includes a plurality of processing nodes and a clock conditioning circuit configurable with multiple operating modes to generate customized clock signals for the plurality of processing nodes. The clock conditioning circuit generally includes one or more first circuits, each configurable to monitor one or more parameters indicative of a condition of a first clock signal and to generate one or more control signals based on the monitoring and one or more second circuits, each configurable to generate a second clock signal by conditioning the first clock signal based on at least one of the one or more control signals generated by at least one of the one or more first circuits.

Other aspects provide: an apparatus operable, configured, or otherwise adapted to perform any one or more of the methods described herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
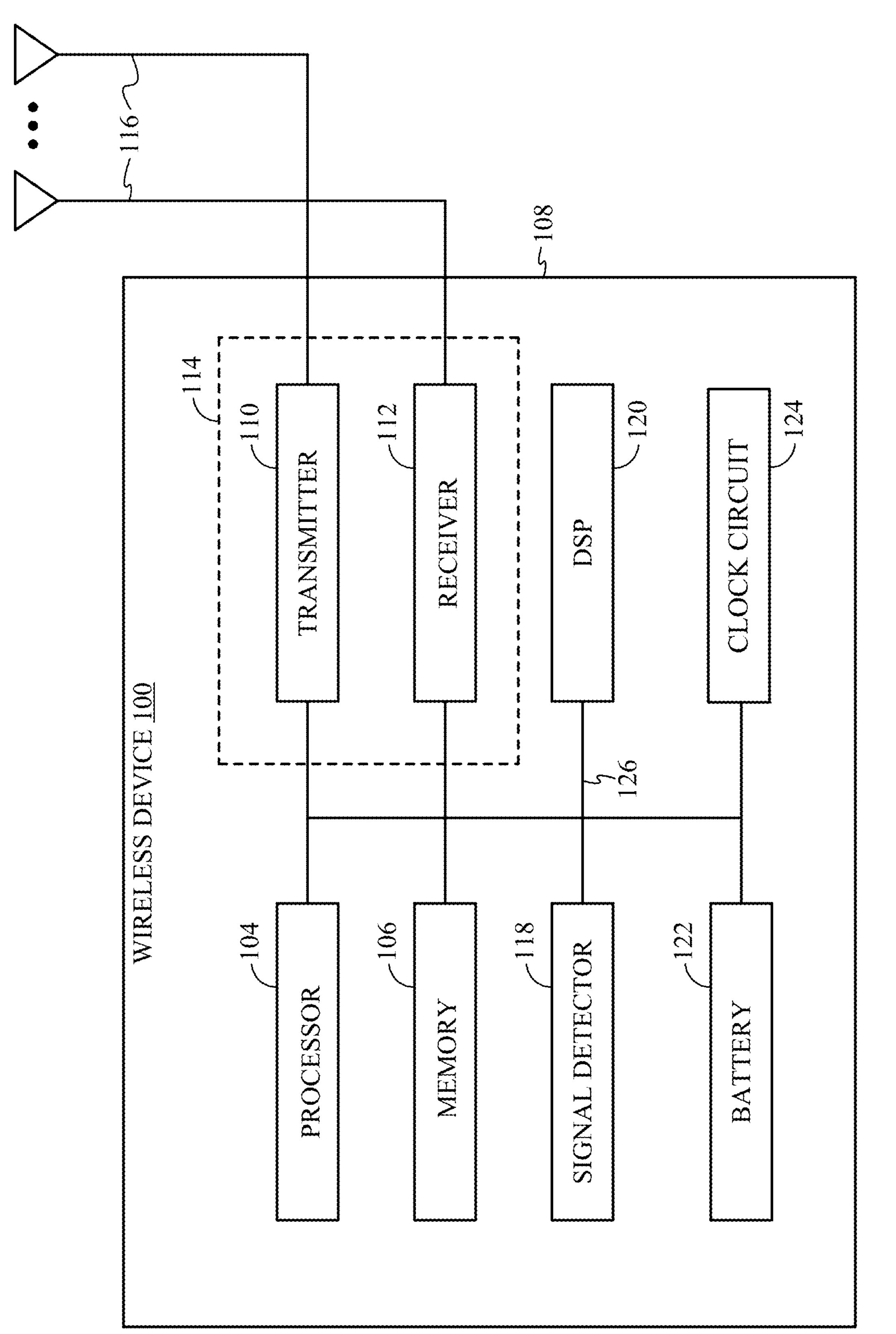
FIG. 1 is a block diagram of an example device, in which aspects of the present disclosure may be practiced.

Certain aspects of the present disclosure generally relate to electronic devices and, more particularly, to techniques and apparatus for clock signal conditioning.

As noted above, various electronic devices use clock signals to control various types of circuits. The clock signals may be distributed throughout the devices through dividers, buffers, repeaters, and/or other suitable circuits. For wireless devices that include a plurality of radio frequency (RF) chains, it may be particularly important that the clock signals provided to the multiple RF chains remain synchronized with each other.

Thus, wireless devices may include clock conditioning circuits to improve and maintain timing (e.g., synchronization) between clock signals provided to multiple RF chains. One challenge with such clock conditioning circuits is that they may need to be optimized for a given use case. For example, if a wireless device has multiple RF chains in order to support different wireless protocols, such as cellular (e.g., 4G/5G in accordance with 3GPP standards) or Wi-Fi protocols, separate clock conditioning circuits may need to be designed and included. In addition to increasing development time and cost, providing a number of clock conditioning circuits occupy precious chip real estate and result in additional power consumption.

As will be described in greater detail below, a modular design is proposed that allows reconfiguration and reuse of clock monitoring and conditioning circuits that may be able to support various products of different process nodes, with reduced implementation cost overhead and reduced development cycle time. A design approach proposed herein effectively allows for clock condition improving and monitoring using modular functional blocks that can be reconfigured and reused.

According to certain aspects, such a modular approach may involve a clock conditioning circuit that can be configured in one of the three operating modes, a first mode where clock signal is monitored and conditions (tuned/improved), a second mode where the clock signal is improved, and a third mode where the clock signal is monitored. As will be described in greater detail below, all three modes may share the same elements which can be configured, enabled and controlled differently.

Techniques described herein may be utilized in a wide variety of devices and use cases where one or more clock sources provide clock signals to one or more receiver nodes. Wireless communication devices are just one example of a type of device in which aspects of the present disclosure may be utilized.

Certain example embodiments are described below in the context of 3GPP and Wi-Fi enabled devices for simplicity only. It is to be understood that the example embodiments are equally applicable for devices using signals of other various wireless standards or protocols. As used herein, the terms "wireless local area network (WLAN)" and "Wi-Fi" can include communications governed by the IEEE 802.11 standards, BLUETOOTH®, and/or other technologies used in wireless communications (e.g., ZigBee and WiGig).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

FIG. 1 illustrates an example wireless device 100, in which aspects of the present disclosure may be implemented. While aspects of the present disclosure may be used to advantage for RF chains, the aspects may more generally be applicable in any type of device with various processing elements that stand to benefit from improved clock signals.

The device 100 may be a battery-operated device such as a cellular phone, a personal digital assistant (PDA), a handheld device, a wireless modem, a smartphone, a tablet, a laptop computer, a personal computer, a wearable device, an Internet of Things (IoT) device, an augmented reality device, etc. The device 100 is an example of a device that may be configured to implement the various systems and methods described herein.

The device 100 may include a processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a transmitter 110 and/or a receiver 112 to allow transmission and/or reception, respectively, of data between the device 100 and a remote location. In some cases, the transmitter 110 and receiver 112 may be combined into a transceiver 114. One or more antennas 116 may be attached or otherwise coupled to a housing 108 of the device 100 and electrically coupled to the transceiver 114. For certain aspects, the device 100 may also include multiple transmitters, multiple receivers, and/or multiple transceivers (not shown).

The device 100 may also include a signal detector 118 that may be used in an effort to detect and quantify the level of signals received by the transceiver 114. The signal detector 118 may detect such signals as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source-such as a wall adapter or a wireless power charger—is unavailable). The battery 122 illustrated in FIG. 1 may represent multiple portable power sources, such as a main battery and a backup battery (or a supercapacitor). In some cases, the battery 122 may be rechargeable.

The device 100 may also include a clock circuit 124. Clock circuit 124 may include, a local oscillator (LO) distribution circuit and a baseband processor to provide clock signals to transceiver 114. The transceiver 114 may communicate with other wireless devices within distinct operating frequency bands and/or using distinct communication protocols. For example, a Wi-Fi transceiver may communicate within a 2.4 GHz frequency band and/or within a 5 GHz frequency band in accordance with the IEEE 802.11 specification. A cellular transceiver may communicate within various RF frequency bands in accordance with a 4G Long Term Evolution (LTE) protocol described by the 3rd Generation Partnership Project (3GPP) (e.g., between approximately 700 MHZ and approximately 3.9 GHZ) and/or in accordance with other cellular protocols (e.g., a Global System for Mobile (GSM) communications protocol).

The LO distribution circuit may generate a first clock signal that may be used to modulate and/or demodulate data within the transceiver 114. The transceiver 114 may include an analog processor and may be coupled to the antenna(s) 116.

The transceiver 114 may transmit and receive data through a wireless communication medium via the antenna(s) 116. The baseband processor may generate and/or receive baseband data including, for example, Wi-Fi, cellular, ZigBee, WiGig, and/or any technically feasible baseband data.

In some aspects, a baseband processor may provide transmit data (Tx Data) to and receive data (Rx data) from the transceiver 114. In some cases The first analog processor 130 may include a configurable LO divider (not shown for simplicity) to divide and/or condition a first clock signal.

While not shown, a second transceiver may be similar to transceiver 114 and may allow the wireless device 102 to transmit and receive data through the wireless communication medium. A baseband processor may also provide Tx data to and receive Rx data from the second transceiver, while an analog processor may also include a configurable LO divider (not shown for simplicity) to divide and/or condition a second clock signal.

The various components of the device 100 may be coupled together by a bus system 126. The bus system 126 may include a power bus, a control signal bus (e.g., system power management interface (SPMI) or inter-integrated circuit (I2C) bus), and/or a status signal bus in addition to a data bus. Additionally or alternatively, various combinations of the components of the device 100 may be coupled together by one or more other suitable techniques.

Example Clock Conditioning Circuit

As noted above, clock conditioning circuits may help improve and maintain timing between clock signals provided to multiple processing elements. For example, a wireless device may include clock conditioning circuits to improve and maintain timing between clock signals provided to multiple RF chains.

Aspects of the present disclosure provide a modular design approach that allows reconfiguration and reuse of clock monitoring and conditioning circuits. As a result, the modular approach may be able to support various products of different process nodes, with reduced implementation cost overhead and reduced development cycle time.

Figure 2:
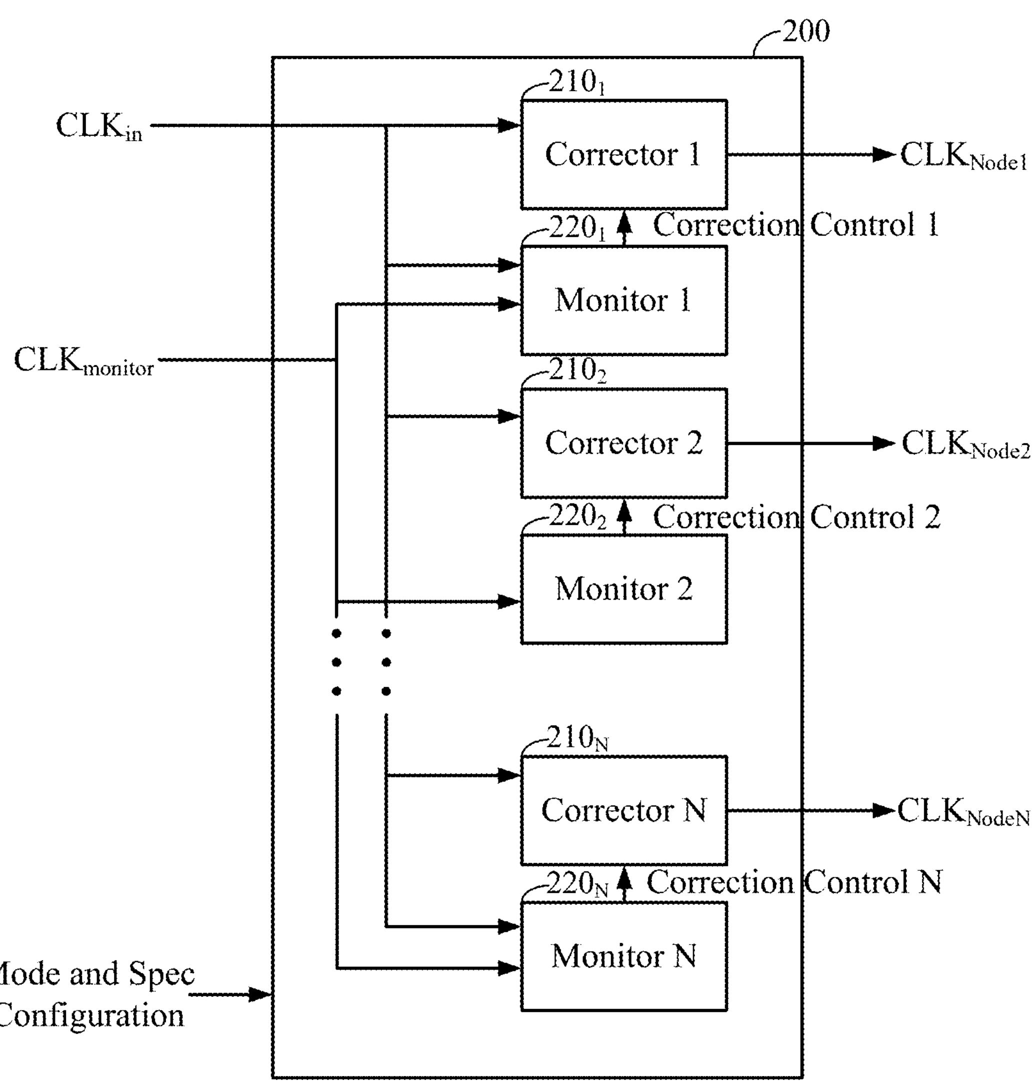
FIG. 2 is a block diagram of an example clock conditioning circuit, in accordance with certain aspects of the present disclosure.

FIG. 2 is a block diagram of an example clock condition circuit 200, in accordance with a modular design approach proposed herein.

As illustrated, the clock conditioning circuit 200 may receive an input clock signal ($CLK_{in}$) and generate one or more conditioned N clock signals ($CLK_{Node1}$, $CLK_{Node2}$, . . . . $CLK_{NodeN}$) that may be output to different receiving nodes (e.g., processing elements).

As shown, the clock condition circuit 200 may include a number of corrector circuits 210 (210$_1$, 210$_2$, . . . 210$_N$) designed to condition the input clock signal clock signal and one or more monitor circuits 220 (220$_1$, 220$_2$, . . . 220$_N$) designed to monitor the input clock signal. The modular design of the corrector circuits 210 and/or monitor circuits 220 may allow clock signal correction, improvement, and monitoring to be customized for each receiving node ($Node_1$ . . . . $Node_n$). Customizing chip clock conditioning for individual receiving nodes in this manner may improve overall performance.

Further, for each receiving node, the corrector circuits 210 and/or monitor circuits 220 may be configured in one of the three operating modes.

These operating modes may include a first mode where the input clock signal is monitored and conditioned (tuned/improved), a second mode where the input clock signal is improved (e.g., and corresponding monitor circuits may be disabled/powered down), and a third mode where the clock signal is monitored (e.g., and tuning paths of corrector circuits bypassed). As will be described in greater detail below, all three modes may share the same elements which can be configured, enabled and controlled differently.

Figure 3:
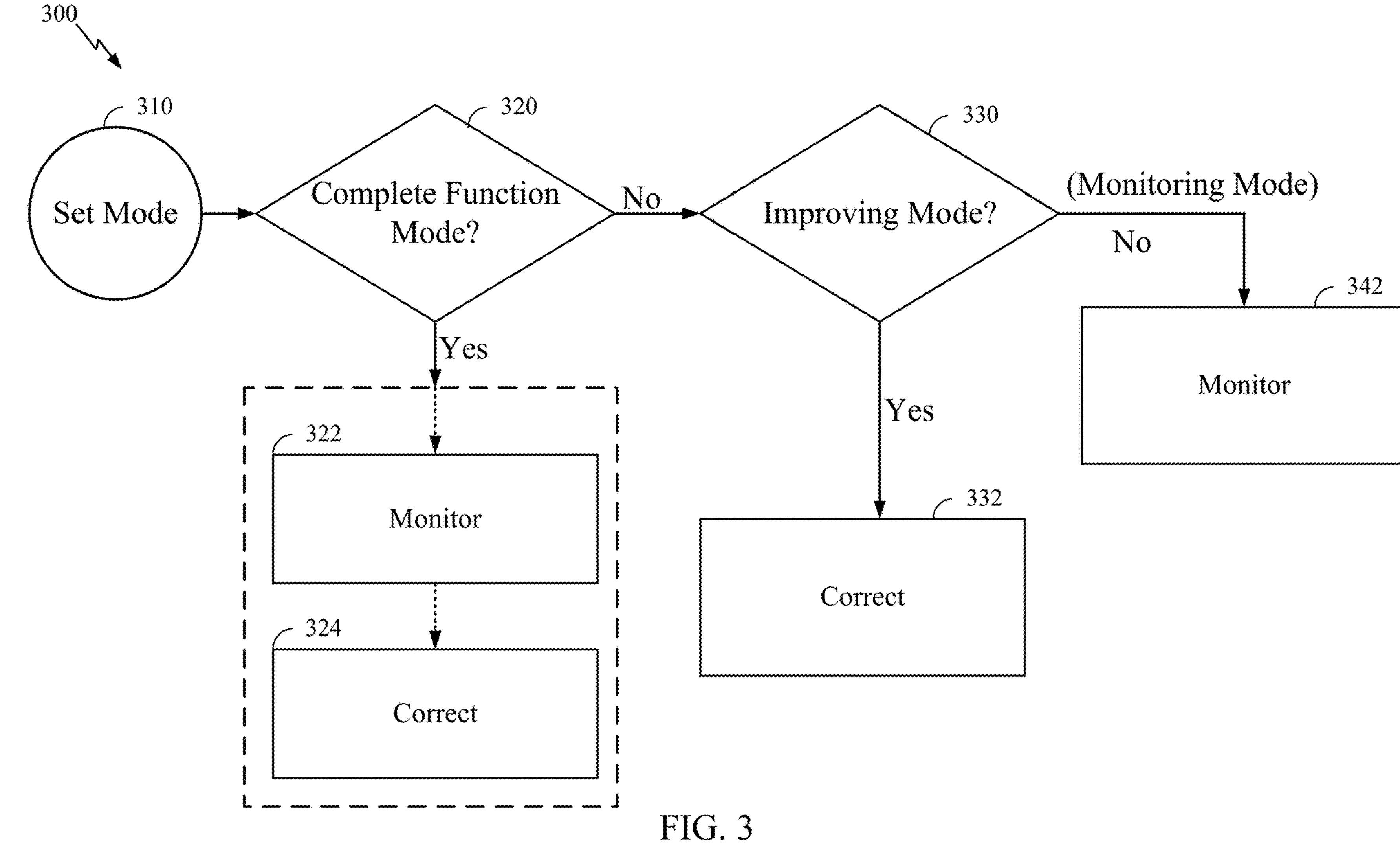
FIG. 3 is a flow diagram illustrating example operating modes of a clock conditioning circuit, in accordance with certain aspects of the present disclosure.

FIG. 3 is a flow diagram 300 summarizing these example operating modes of a clock conditioning circuit, in accordance with certain aspects of the present disclosure.

A mode may be set or configured, at 310. For example, the mode may be set based on one or more configuration signals (e.g., labeled mode and spec configuration in FIG. 2).

Such configuration signals may be used to select a particular operating mode and/or set an operating parameter (for one or more receiving node). For example, the mode and specification configuration signals may determine the resolution, accuracy and/or operation modes of building blocks If the mode is what may be referred to as a complete function mode, as determined at 320, the input clock signal will be both monitored (as indicated at 322) and corrected (as indicated at 324).

If the mode is what may be referred to as an improving mode, as determined at 330, the input clock signal will be corrected (as indicated at 332). The improving (only) mode may be suitable, for example, after the monitoring circuit has been used (e.g., to monitor quality of the clock signal) during a certain mode (e.g., synchronization or calibration) and the monitoring circuit can be subsequently disabled to conserve power.

If the mode is what may be referred to as a monitoring mode, the input clock signal will be monitored only (as indicated at 332). In this mode, as will be described below in greater detail below, an uncorrected version of the input clock signal may selected as the output clock signal (e.g., the input clock signal may bypass a tuning circuit).

In general, the monitor circuits 220 may be configured to monitor the clock quality. There are various parameters that a monitor circuit may be configured for monitor and/or that a corrector circuit may be configured to correct. Example of such parameters include, but are not limited to duty cycle, clock phase, and clock jitter.

For example, the monitor circuits may be configured to monitor how far a clock signal duty cycle is from a target (e.g., a target duty cycle of 50%). The corrector circuits may be configured to condition or tune the input clock signal based on the condition of the clock signal as determined by a monitor circuit. In such cases, the target parameter may be configured (e.g., via configuration signals).

Figure 4:
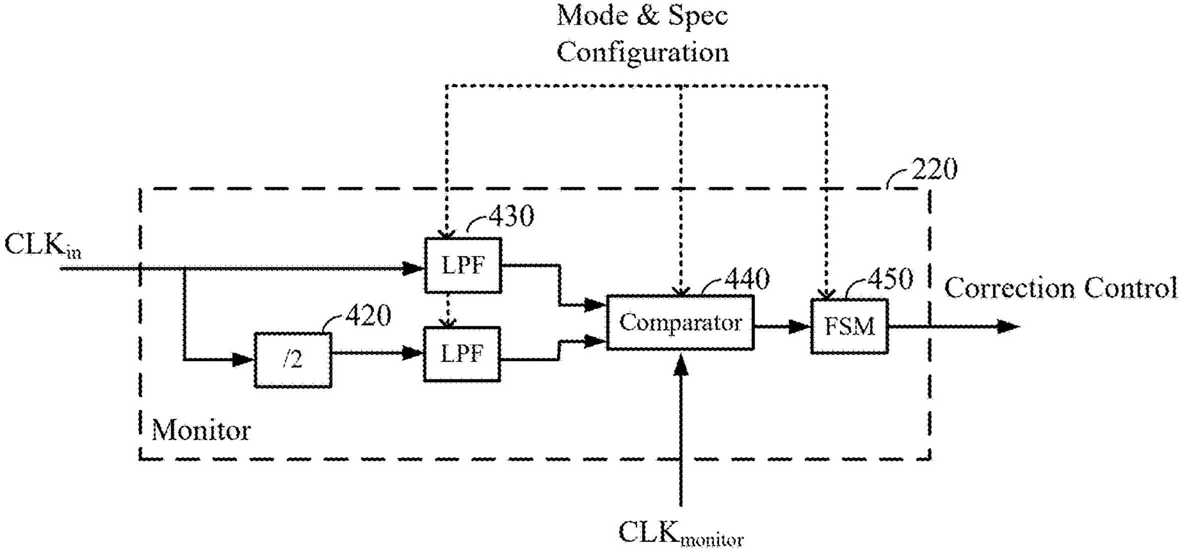
FIG. 4 is an example monitor block of a clock conditioning circuit, in accordance with certain aspects of the present disclosure.

FIG. 4 is an example monitor circuit 220, in accordance with certain aspects of the present disclosure. In the illustrated example, the input root clock signal may be processed by a frequency divider 420 designed to divide the frequency of the input clock signal by two and create a clock signal with a 50% duty cycle.

The divided clock signal and input clock signal may be passed through low pass filters (LPFs) 430. A comparator circuit 440 may be used to determine a difference between a parameter of the input clock signal and a target parameter.

In the illustrated example, an output of the comparator circuit 440 may be provided to a finite state machine (FSM) 450 which may generate a correction control signal. The FSM and control signals may utilize programmable parameters which may be stored in retention cells (such as one-time-programmable-OTP-memory or cells). Using an FSM may allow some parameters to be changed and a circuit portion may be resynthesized without substantial redesign. As will be described with reference to FIG. 5, the correction control signal may be used to control a tuning circuit of a corresponding corrector circuit 210.

In some cases, a clock monitor signal ($CLK_{monitor}$) may be used to essentially enable and disable the clock monitor circuit 220. For example, the clock monitor signal may enable the monitor circuit during certain modes where monitoring is used (e.g., a calibration or synchronization mode) and, after the correction control signal (and corresponding settings) are generated, the circuit may be disabled.

As illustrated, mode and specification configuration signals may also be used to configure the monitor circuit. For example, the mode and specification configuration signals may be used to set the value of certain target parameters (e.g., a target duty cycle, clock phase, or jitter) and/or configure other components, such as the LPFs and FSM (e.g., to control the range and/or resolution/granularity of the correction control signal).

Figure 5:
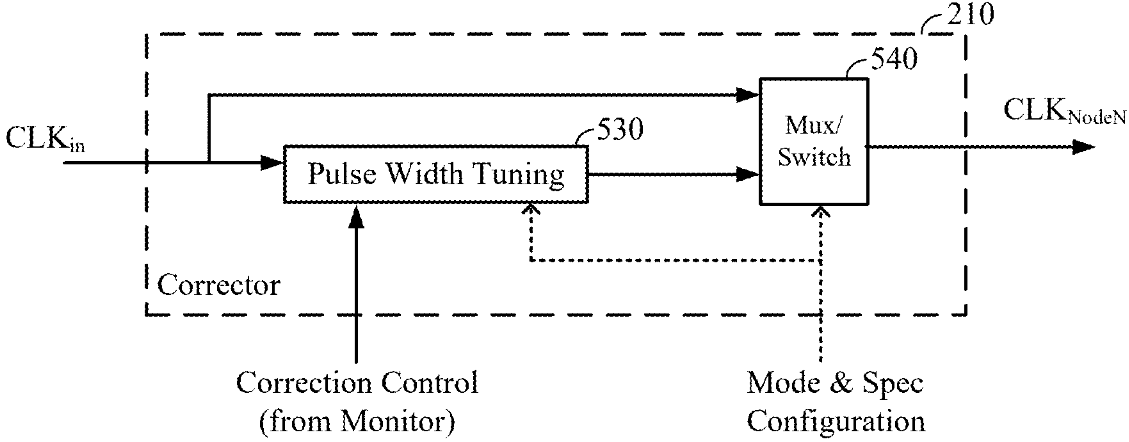
FIG. 5 is an example corrector block of a clock conditioning circuit, in accordance with certain aspects of the present disclosure.

FIG. 5 is an example corrector circuit 210, in accordance with certain aspects of the present disclosure. As noted above, the correction control signal generated by the clock monitor circuit 220 may be used to control a tuning circuit of the corrector circuit to achieve a desired correction/improvement. For example, in the illustrated example, the correction control signal is use to control a pulse width tuning circuit 530 to achieve a desired pulse width. As illustrated, the pulse width tuning circuit 530 may also be configured with the mode and specification configuration signals (e.g., to set a given target or resolution).

Figure 6A:
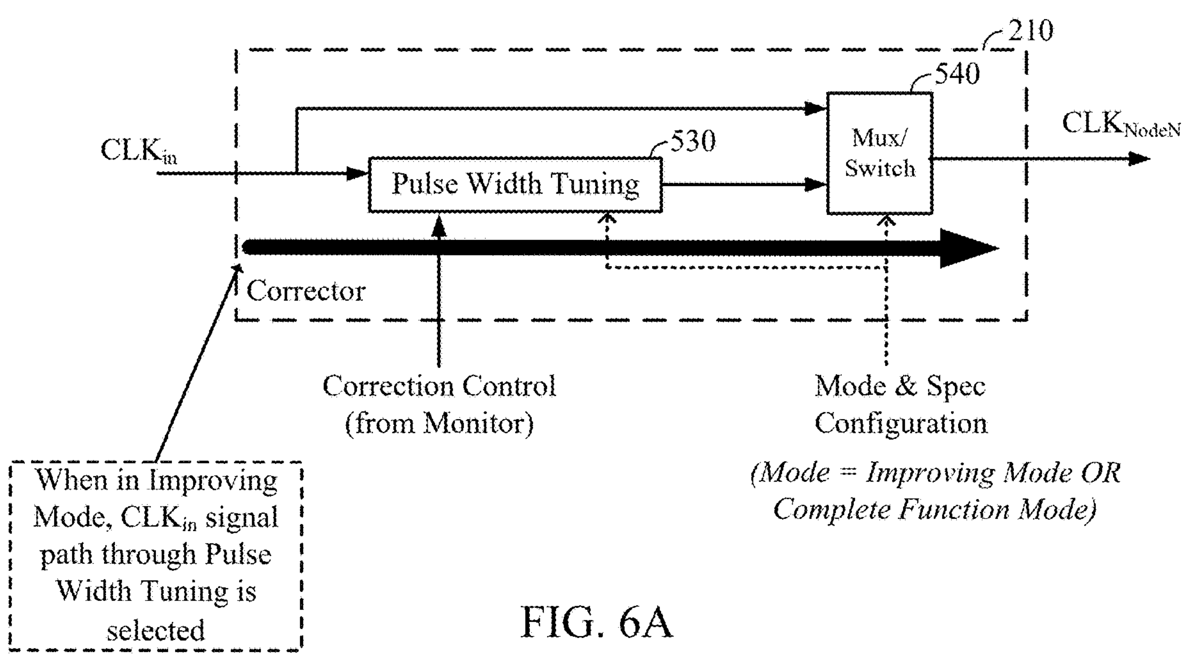
FIGS. 6A and 6B illustrate the corrector block of FIG. 5 during Improving Mode, Complete Function Mode, and Monitoring Mode, in accordance with certain aspects of the present disclosure.

The mode and specification configuration signals may also be used to control a multiplexor 540 based on an operating mode. For example, as illustrated in FIG. 6A, when in an improving mode or complete function mode, the multiplexor 540 may be controlled to output the conditioned clock signal (selecting the signal path through the pulse width tuning circuit 530), as indicated at 550.

Figure 6B:
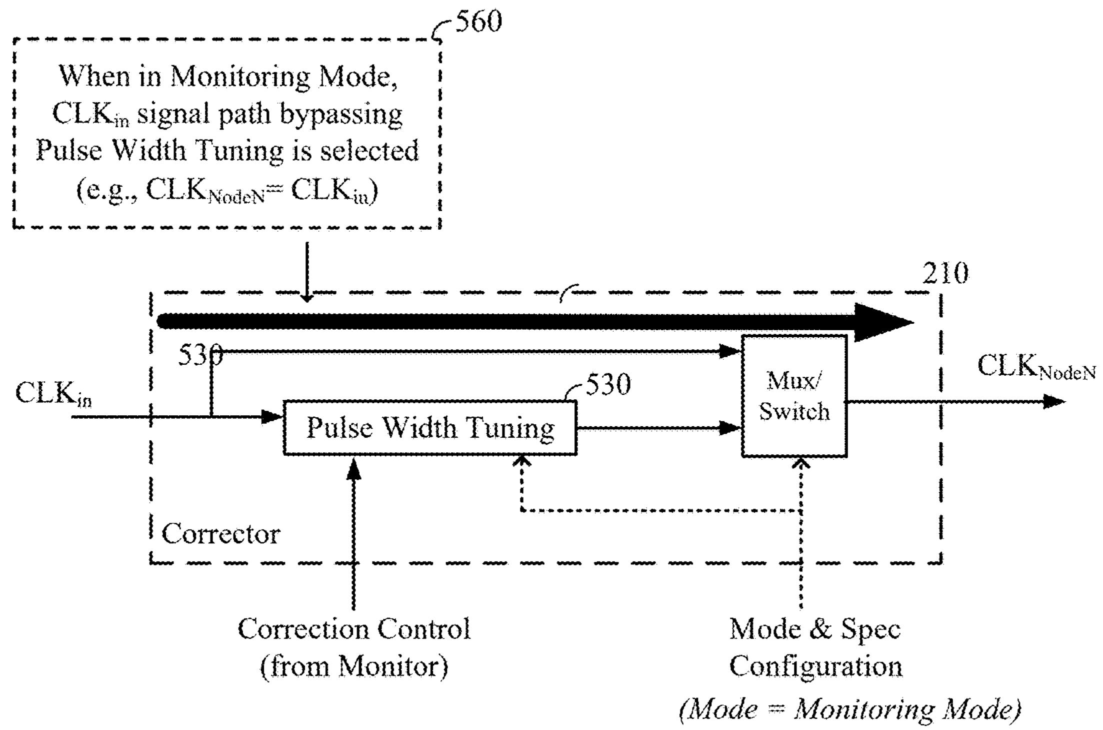

On the other hand, as illustrated in FIG. 6B, when in the monitoring (only) mode, the multiplexor 540 may be controlled to output the conditioned clock signal (selecting the signal path bypassing the pulse width tuning circuit 530). In other words, in this mode, the input clock signal is output unconditioned (e.g., $CLK_{NodeN}$=$CLK_{in}$), as indicated at 550.

According to the modular designed proposed herein, the physical implementation for each of the building blocks described above (e.g., the monitor and/or correcting circuits) can be reconfigured/reused as elements to customize a clock signal for a given receiving node.

In some cases, the various functional modules described herein may share a common design, but may be physically separated (e.g., located at different areas of an SoC). In some cases, time-sharing of modules may be supported with different configurations (e.g., parameters) stored, for example, in portions of reserved retention cells.

Figure 7:
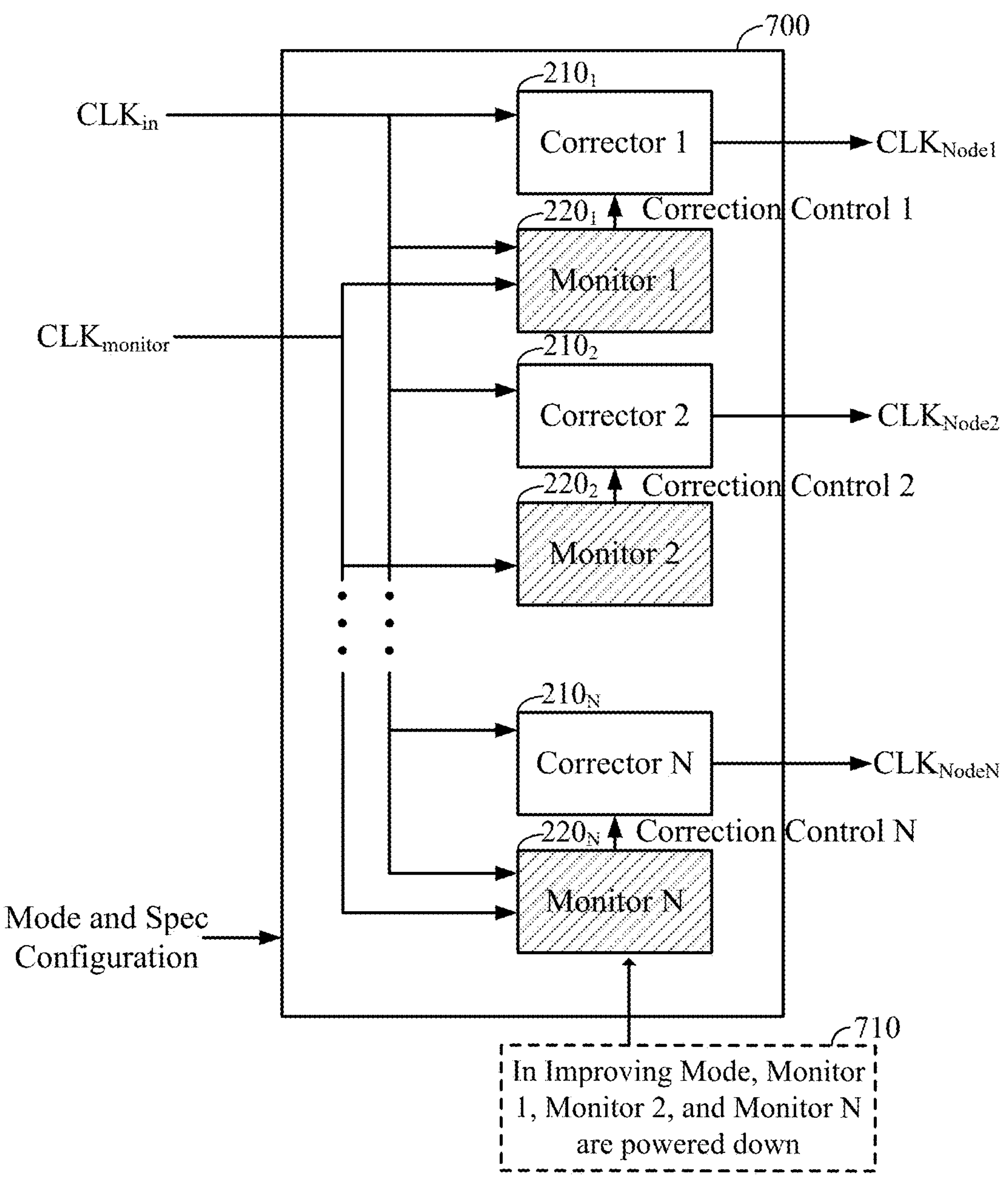
FIG. 7 is a block diagram of the example clock circuit of FIG. 2 during Improving Mode, in accordance with certain aspects of the present disclosure.

In some cases, only necessary modules are enabled to save power (e.g., as previously noted monitor circuits may be disabled when not in use). For example, FIG. 7 illustrates an example clock conditioning circuit 700 where various monitor circuits 220 are disabled (e.g., powered down), as indicated at 710. In some cases, as noted below, the mode configuration signal and/or clock monitor signal may be used to disable the monitor circuits 220.

Figure 8:
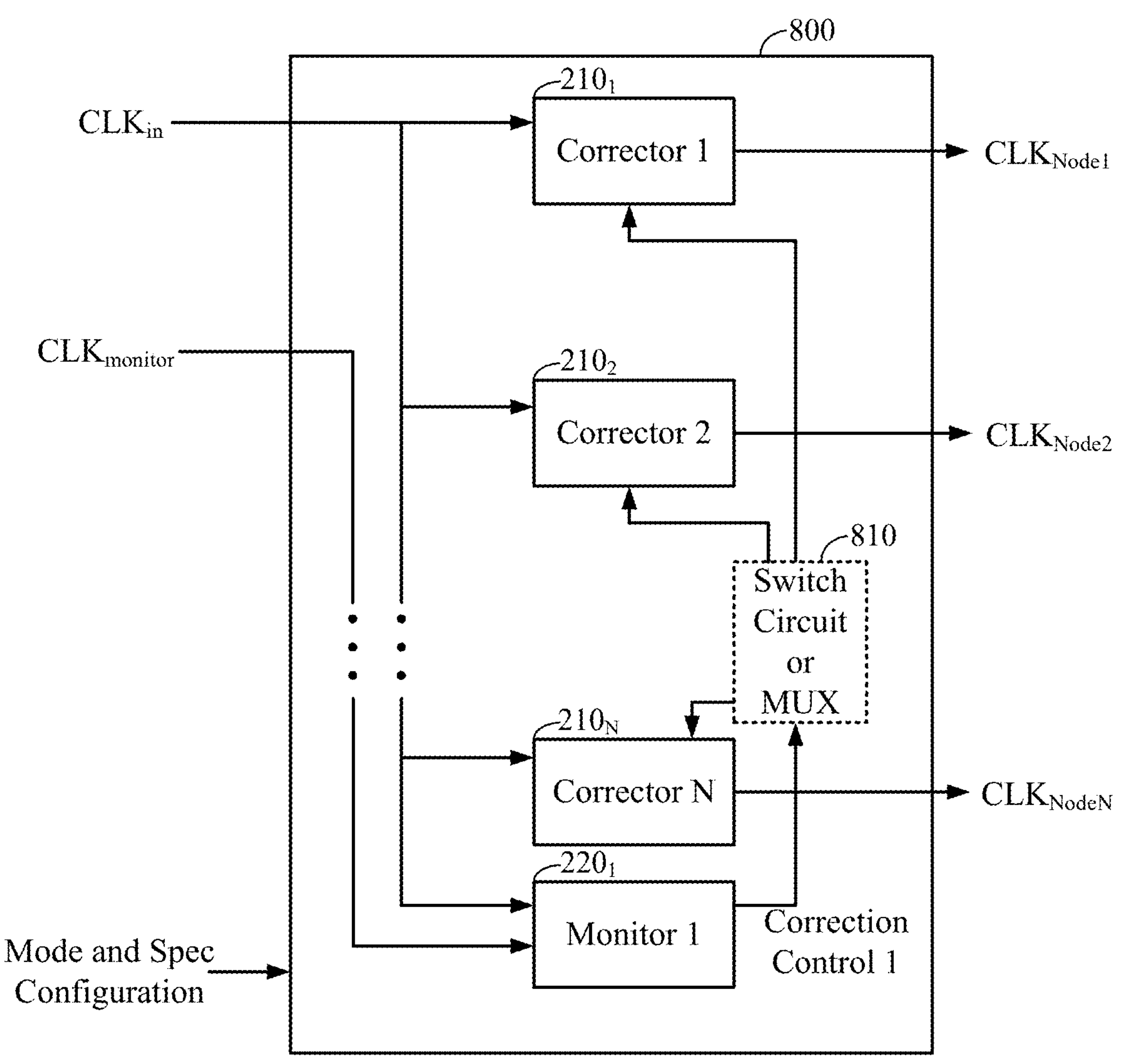
FIG. 8 is a block diagram of an example clock circuit illustrating a shared monitor block, in accordance with certain aspects of the present disclosure.

In some cases, a single functional module of one type may be shared between other types of functional modules. For example, as illustrated in FIG. 8, an example clock conditioning circuit 800 may share a single monitor circuit 220 among multiple corrector circuits.

This may be possible, for example, as clock signals for different receiving nodes may be monitored and tuned (e.g. synchronized/calibrated) at different times. As illustrated, in some cases a switch or multiplexer 810 may be used to route the control signals generated by the shared monitor circuit 220 to an appropriate corrector circuit 210.

Time sharing may be possible, as circuits may not need to be on always and, so, can be switched for different clock sources and different events. This may be used, for example, when performing duty cycle correction as previously described. In such cases, retention cells may be used to store parameters (with minimal power consumption) once the control signals are determined. Then monitoring and correcting circuits may be (re-used) for other clock sources (and/or just power down before next time they are triggered).

In some cases, the clock source for the $CLK_{in}$ signal may be selectable. In this manner, different clock sources may be selected (e.g., via a switch or multiplexor) at different times. Similarly, the receiving nodes to which output clock signals are routed may also be selectable. In this manner, there may be some freedom to configure the clock source(s) and/or which nodes receive corrected clock signals.

In some cases, an adaptive algorithm may be used. For example, the resolution and/or quality of one or more of the monitor circuits and/or corrector circuits may be adjusted, based on a given use case or based on performance feedback information (e.g., from a receiving node (or processing element). Such adaptation may be achieved, for example, via firmware or hardware. In some cases, a design may be combined with an automatic design flow, such that (monitoring and/or correcting) modules may be portable and used.

Example Aspects

In addition to the various aspects described above, specific combinations of aspects are within the scope of the disclosure, some of which are detailed below:

Clause 1: An apparatus, comprising: a plurality of processing nodes; and a clock conditioning circuit configurable with multiple operating modes to generate customized clock signals for the plurality of processing nodes, the clock conditioning circuit including one or more first circuits, each configurable to monitor one or more parameters indicative of a condition of a first clock signal and to generate one or more control signals based on the monitoring; and one or more second circuits, each configurable to generate a second clock signal by conditioning the first clock signal based on at least one of the one or more control signals generated by at least one of the one or more first circuits.

Clause 2: The apparatus of Clause 1, wherein the one or more parameters comprise at least one of: duty cycle, clock phase, or jitter.

Clause 3: The apparatus of any one of Clauses 1-2, wherein each first circuit and second circuit is configured to operate in one of the operating modes based on a set of one or more configuration signals.

Clause 4: The apparatus of Clause 3, wherein the configuration signals also configure how each first circuit performs the monitoring and generates the one or more control signals.

Clause 5: The apparatus of Clause 4, wherein the configuration signals configure the first circuit to monitor for a target value of the one or more parameters.

Clause 6: The apparatus of Clause 5, wherein: each first circuit is configurable to generate the one or more control signals based on a difference in a monitored value of a parameter to the target value; and each second circuit comprises a tuning circuit designed to condition the first clock signal, based on the one or more control signals, to generate the second clock signal.

Clause 7: The apparatus of any one of Clauses 1-6, wherein: the one or more second circuits comprise a plurality of second circuits that share a common one of the at least one first circuits.

Clause 8: The apparatus of any one of Clauses 1-7, wherein the multiple operating modes comprise at least one operating mode in which: at least one of the first circuits is configured to monitor; and at least one of the second circuits is configured to condition the first clock signal, based on the one or more control signals generated by the at least one of the first circuits, to generate the second clock signal.

Clause 9: The apparatus of any one of Clauses 1-8, wherein the multiple operating modes comprise at least one operating mode in which: at least one of the first circuits is disabled for monitoring; and at least one of the second circuits is configured to condition the first clock signal, based on the one or more control signals previously generated by the at least one of the first circuits, to generate the second clock signal.

Clause 10: The apparatus of any one of Clauses 1-9, wherein the multiple operating modes comprise at least one operating mode in which: at least one of the first circuits is configured to monitor; and at least one of the second circuits is configured to output the first clock signal, without conditioning, as the second clock signal.

Clause 11: The apparatus of any one of Clauses 1-10, wherein the at least one of the second circuits comprises a multiplexor allowing for selecting, as the second clock signal, the first clock signal with or without conditioning.

Clause 12: The apparatus of any one of Clauses 1-11, wherein the one or more first circuits comprise at least two instances of first circuits configured differently to monitor with different resolution.

Clause 13: The apparatus of any one of Clauses 1-12, wherein the one or more second circuits comprise at least two instances of second circuits configured differently to condition the first clock signal by tuning with different resolution.

Clause 14: The apparatus of any one of Clauses 1-13, further comprising at least one of: at least one third circuit configurable to select the first clock signal from a plurality of different clock sources; or at least one fourth circuit configurable to select which one or more of the processing nodes the customized clock signals are routed to.

Clause 15: The apparatus of Clause 14, wherein the clock conditioning circuit is configurable to at least one of: control the at least one third circuit to select different clock sources at different times; or control the at least one fourth circuit to select different processing nodes at different times to route different customized clock signals to.

Clause 16: The apparatus of any one of Clauses 1-15, wherein the clock conditioning circuit is configurable to adjust at least one of: a monitoring resolution of at least one of the one or more first circuits; or a tuning resolution of at least one of the one or more second circuits.

Clause 17: The apparatus of Clause 16, wherein the adjusting is based on feedback information provided by the processing elements.

Clause 18: A clock conditioning circuit configurable with multiple operating modes to generate customized clock signals, comprising: one or more first circuits, each configurable to monitor one or more parameters indicative of a condition of a first clock signal and to generate one or more control signals based on the monitoring; and one or more second circuits, each configurable to generate a second clock signal by conditioning the first clock signal based on at least one of the one or more control signals generated by at least one of the one or more first circuits.

Clause 19: The apparatus of Clause 18, wherein the one or more parameters comprise at least one of: duty cycle, clock phase, or jitter.

Clause 20: A method for generating customized clock signals for a plurality of processing nodes, comprising: configuring one or more first circuits, each to monitor one or more parameters indicative of a condition of a first clock signal and to generate one or more control signals based on the monitoring; and configuring one or more second circuits, each to generate a second clock signal by conditioning the first clock signal based on at least one of the one or more control signals generated by at least one of the one or more first circuits

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or a processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An apparatus, comprising:

a plurality of processing nodes; and a clock conditioning circuit configurable with multiple operating modes to generate customized clock signals for the plurality of processing nodes, the clock conditioning circuit including one or more first circuits, each configurable to monitor one or more parameters indicative of a condition of a first clock signal and to generate one or more control signals based on the monitoring; and one or more second circuits, each configurable to generate a second clock signal by conditioning the first clock signal based on at least one of the one or more control signals generated by at least one of the one or more first circuits.

2. The apparatus of claim 1, wherein the one or more parameters comprise at least one of: duty cycle, clock phase, or jitter.

3. The apparatus of claim 1, wherein each of the one or more first circuits and the one or more second circuits is configured to operate in one of the operating modes based on a set of one or more configuration signals.

4. The apparatus of claim 3, wherein the configuration signals also configure how each of the one or more first circuits performs the monitoring and generates the one or more control signals.

5. The apparatus of claim 4, wherein the configuration signals configure the first circuit to monitor for a target value of the one or more parameters.

6. The apparatus of claim 5, wherein:

each of the one or more first circuits is configurable to generate the one or more control signals based on a difference in a monitored value of a parameter to the target value; and each of the one or more second circuits comprises a tuning circuit designed to condition the first clock signal, based on the one or more control signals, to generate the second clock signal.

7. The apparatus of claim 1, wherein:

the one or more second circuits comprise a plurality of second circuits that share a common one of the at least one of the one or more first circuits.

8. The apparatus of claim 1, wherein the multiple operating modes comprise at least one operating mode in which:

at least one of the first circuits is configured to monitor; and at least one of the second circuits is configured to condition the first clock signal, based on the one or more control signals generated by the at least one of the first circuits, to generate the second clock signal.

9. The apparatus of claim 1, wherein the multiple operating modes comprise at least one operating mode in which:

at least one of the first circuits is disabled for monitoring; and at least one of the second circuits is configured to condition the first clock signal, based on the one or more control signals previously generated by the at least one of the first circuits, to generate the second clock signal.

10. The apparatus of claim 1, wherein the multiple operating modes comprise at least one operating mode in which:

at least one of the first circuits is configured to monitor; and at least one of the second circuits is configured to output the first clock signal, without conditioning, as the second clock signal.

11. The apparatus of claim 1, wherein the at least one of the second circuits comprises a multiplexor allowing for selecting, as the second clock signal, the first clock signal with or without conditioning.

12. The apparatus of claim 1, wherein the one or more first circuits comprise at least two instances of first circuits configured differently to monitor with different resolution.

13. The apparatus of claim 1, wherein the one or more second circuits comprise at least two instances of second circuits configured differently to condition the first clock signal by tuning with different resolution.

14. The apparatus of claim 1, further comprising at least one of:

at least one third circuit configurable to select the first clock signal from a plurality of different clock sources; or at least one fourth circuit configurable to select which one or more of the processing nodes the customized clock signals are routed to.

15. The apparatus of claim 14, wherein the clock conditioning circuit is configurable to at least one of:

control the at least one third circuit to select different clock sources at different times; or control the at least one fourth circuit to select different processing nodes at different times to route different customized clock signals to.

16. The apparatus of claim 1, wherein the clock conditioning circuit is configurable to adjust at least one of:

a monitoring resolution of at least one of the one or more first circuits; or a tuning resolution of at least one of the one or more second circuits.

17. The apparatus of claim 16, wherein the adjusting is based on feedback information provided by the plurality of processing nodes.

18. A clock conditioning circuit configurable with multiple operating modes to generate customized clock signals, comprising:

one or more first circuits, each configurable to monitor one or more parameters indicative of a condition of a first clock signal and to generate one or more control signals based on the monitoring; and one or more second circuits, each configurable to generate a second clock signal by conditioning the first clock signal based on at least one of the one or more control signals generated by at least one of the one or more first circuits.

19. The clock conditioning circuit of claim 18, wherein the one or more parameters comprise at least one of: duty cycle, clock phase, or jitter.

20. A method for generating customized clock signals for a plurality of processing nodes, comprising:

configuring one or more first circuits, each to monitor one or more parameters indicative of a condition of a first clock signal and to generate one or more control signals based on the monitoring; and configuring one or more second circuits, each to generate a second clock signal by conditioning the first clock signal based on at least one of the one or more control signals generated by at least one of the one or more first circuits.

* * * * *